US007404108B2

(12) United States Patent
Caplan et al.

(10) Patent No.: US 7,404,108 B2
(45) Date of Patent: Jul. 22, 2008

(54) NOTIFICATION METHOD AND APPARATUS IN A DATA PROCESSING SYSTEM

(75) Inventors: Jeffrey W. Caplan, Orlando, FL (US); Earle Ellsworth, Benson, AZ (US)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 10/913,205

(22) Filed: Aug. 6, 2004

(65) Prior Publication Data

US 2006/0031707 A1 Feb. 9, 2006

(51) Int. Cl.
G06F 11/00 (2006.01)
(52) U.S. Cl. ........................................ 714/48; 719/318
(58) Field of Classification Search ................ 709/205, 709/206, 207, 227, 237
See application file for complete search history.

(56) References Cited

U.S. PATENT DOCUMENTS

| | | | | |
|---|---|---|---|---|
| 5,740,549 | A * | 4/1998 | Reilly et al. | 705/14 |
| 5,815,663 | A * | 9/1998 | Uomini | 709/219 |
| 5,925,108 | A | 7/1999 | Johnson et al. | |
| 6,138,121 | A | 10/2000 | Costa et al. | |
| 6,148,335 | A | 11/2000 | Haggard et al. | |
| 6,195,685 | B1 | 2/2001 | Mukherjee et al. | |
| 6,202,093 | B1 * | 3/2001 | Bolam et al. | 709/225 |
| 6,272,559 | B1 | 8/2001 | Jones et al. | |
| 6,571,140 | B1 * | 5/2003 | Wewalaarachchi et al. | 700/83 |
| 6,636,981 | B1 | 10/2003 | Barnett et al. | |
| 6,807,558 | B1 * | 10/2004 | Hassett et al. | 709/203 |
| 7,143,123 | B2 * | 11/2006 | Tom et al. | 707/204 |
| 2003/0115291 | A1 * | 6/2003 | Kendall et al. | 709/219 |
| 2003/0149761 | A1 | 8/2003 | Baldwin et al. | |
| 2003/0182428 | A1 * | 9/2003 | Li et al. | 709/227 |
| 2003/0208539 | A1 * | 11/2003 | Gildenblat et al. | 709/205 |
| 2003/0229674 | A1 | 12/2003 | Cabrera et al. | |

(Continued)

FOREIGN PATENT DOCUMENTS

JP 2001-111577 4/2001

(Continued)

OTHER PUBLICATIONS

"The Gnutella Protocol Specification v0.4" (Jul. 2, 2003) Accessed from Internet Archive, http://web.archive.org/web/*/www.stanford.edu/class/cs244b/gnutella_protocol_0.4.pdf.*

(Continued)

*Primary Examiner*—Gabriel L Chu
(74) *Attorney, Agent, or Firm*—Dan Shifrin

(57) ABSTRACT

A method of, apparatus for, or storage device medium having instructions for publishing a first notification within a data processing system where the data processing system comprises a first source generating the first notification, a first destination device, and a second destination device. The source may be a storage unit, a printer, a processing unit, or any other device which is a component of the data processing system. The destination device is typically a monitor, a workstation, a computer, a PC, or other input/output type workstation. The method comprises of having the first destination device subscribe to receive notifications from the first source. In addition, the second destination device subscribes to receive the notifications serially republished from the first destination device. Upon the publication of a notification from the first source to the first destination device, the first destination device will publish the notification to the second destination device.

7 Claims, 3 Drawing Sheets

Application on Computer C detects that Computer A is receiving notification about Storage Device B from Computer B    58

Application on Computer C sends automated subscription request to Computer B requesting notifications published by Storage Device B as pushed from Computer B    60

U.S. PATENT DOCUMENTS

2004/0019645 A1* 1/2004 Goodman et al. ............ 709/206
2005/0055405 A1* 3/2005 Kaminsky et al. ........... 709/206
2005/0268146 A1* 12/2005 Jin et al. ....................... 714/2

OTHER PUBLICATIONS

Rosenblum et al., "A Design Framework for Internet-Scale Event Observation and Notification", ACM 1997.*
Bohossian et al. (2001) IEEE Transactions on Parallel and Distributed Systems 12:99.
Edwards et al. (2004) Proceedings of 42d ACM Southeastern Conference, Huntsville, Alabama—http://www.cs.wustl.edu/~schmidt/PDF/acmse_mda_ec.pdf.
Edwards et al. (2004) Proceedings of 3d ACM International Conference on Generative Programming and Component Engineering, Vancouver, Canada—http://www.cs.wustl.edu/~schmidt/PDF/gpce_mdm_ec.pdf.
Falconstor Software Ipstor Callhome Datasheet http://www.falconstor.com/Brochures/CallHomeDatasheet.pdf.
IBM (1993) Technical Disclosure Bulletin 36:345.
IBM (1995) Technical Disclosure Bulletin 38:399.

* cited by examiner

NOTIFICATION METHOD AND APPARATUS IN A DATA PROCESSING SYSTEM

TECHNICAL FIELD

The present invention is directed toward a notification method and apparatus for use in a data processing system, and more particularly toward a semi-autonomous, real time event notification mesh network.

BACKGROUND ART

A data processing system operator often will require notification concerning events or problems which occur within or with respect to a component of the system. For example, the manager of a data processing system which contains multiple storage devices spread throughout diverse geographical locations may need to receive notification of the status of each storage device at a centralized location. Methods of event notification for events occurring within a data processing system exist, however, known methods often require an active attempt by the system manager to retrieve event information. Such active attempts might consist of the establishment of a VPN connection from a remote location to an internal network. Alternatively, event notification may initially be managed locally and subsequently reported to a central location in a time delayed fashion, such as by email or pager.

If an event notification system requires an active effort by the data processing system manager to retrieve event information, or when the relay of information occurs in a time delayed fashion, the manager will not have the ability to manage the events in real time. In addition, presently known centralized event notification tools lack the ability to serially replicate or republish an event notification from a first receiving workstation to other interconnected workstations. Thus, there is a need in the art for a method and apparatus to monitor notifications from multiple devices across a network grid along with the ability to replicate the notification information to other monitoring stations to form an autonomous real time event notification mesh network.

SUMMARY OF THE INVENTION

One aspect of the present invention is a method of publishing a first notification within a data processing system where the data processing system comprises a first source generating the first notification, a first destination device, and a second destination device. The source may be a storage unit, a printer, a processing unit, or any other device which is a component of the data processing system. The destination device is typically a monitor, a workstation, a computer, a PC, or other input/output type workstation. The method comprises of having the first destination device subscribe to receive notifications from the first source. In addition, the second destination device subscribes to receive the notifications serially republished from the first destination device. Upon the publication of a notification from the first source to the first destination device, the first destination device will publish the notification to the second destination device.

Similarly, the data processing system may also comprise a second source also generating notifications. In such a case, the method may further comprises subscribing the second destination device to receive the second notifications from the second source. In addition, the first destination device may subscribe to the second destination device to receive the second notifications serially republished from the second destination device. Thus, when a notification is published by either source to either destination device, the receiving destination device will further publish the notification to the other destination device.

The data processing system may further comprise a third or subsequent destination devices, in which case the third destination device can subscribe to receive notifications from the first or second destination devices. If, for example, the third destination device has subscribed to receive notifications published to the first destination device, all notifications received by the first destination device may be further published to the third destination device. Thus, in this example, the third destination device could be receiving event notifications published by the second source to the second destination device, republished to the first destination device, and finally republished to the third destination device. Preferably, in such an implementation the method will further comprise detecting that the notification is being relayed through multiple destination devices, and autonomously subscribing the third destination device to receive the second notification directly from the second destination device.

In one embodiment of the invention, a destination device may cause a source to publish notifications at select periodic intervals. Alternatively, a destination device may cause a source to publish a notification only when the status of the source changes. Alternatively, the destination device may cause the source to publish a notification upon receipt by the source of a status request from the destination device.

In any implementation, the subscribing of a destination device to receive a notification from another destination device can preferably be initiated at either the subscribing destination device or the publishing destination device.

Another embodiment of the invention is a data processing system having a first source, a first destination device, and a second destination device capable of performing the above described steps for distributing a notification.

A further embodiment of the invention is an article of manufacture comprising a storage medium having logic embedded therein for programming the components of a data processing system to execute the steps described above for distributing a notification.

DETAILED DESCRIPTION OF THE PREFERRED EMBODIMENT

Figure 1:
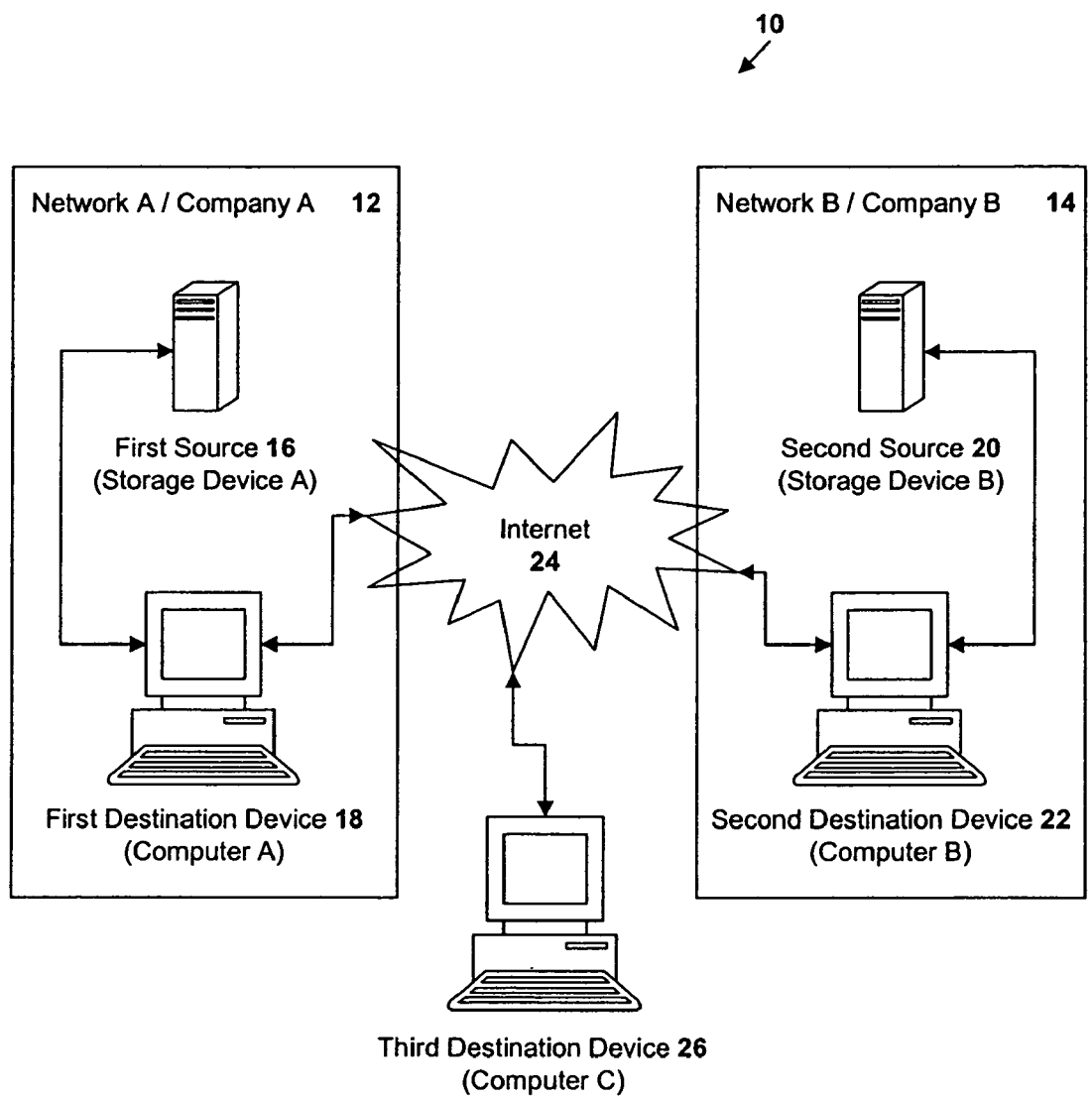
FIG. 1 is a block diagram illustrating a data processing environment in which a preferred embodiment may be implemented.

FIG. 1 illustrates a highly simplified data processing system 10 which is suitable for implementation of the present invention. The data processing system 10 consists of network A 12, associated with company A, and network B 14, associated with company B. A two network system is used for illustration purposes only. Applicant's invention is applicable to a data processing system 10 consisting of any number of independent but interconnected networks. Network A 12 and network B 14 each consist of multiple data processing components communicating with each other. For illustration purposes, network A 12 is depicted as consisting of a first source 16 which is shown as a storage device (Storage Device A) connected to a first destination device 18 which is depicted as Computer A. It is likely, but not necessary, that network A 12 will consist of numerous sources and numerous destination devices. Sources may be storage devices, printers, scanners, processing units, monitors, or any other type of hardware device typically associated with a data processing system 10. A destination device may be any type of input/output device typically associated with a data processing system 10. Typically, destination devices will be computers, workstations, monitors, PCs, servers, mainframes, handheld computers, palmtop computers, telephony devices, network appliances, or any other computational device known in the art.

The first source 16 may be connected to the first destination device 18 within network A 12 through a channel or any other communication pathway known in the art such as a fiber channel, storage area network (SAN), direct interconnections, wireless connection, enterprise system connection channel (ESCON), or other types of interface mechanisms known in the art. Network B 14 also can consist of numerous sources and destination devices all as described above with respect to network A 12. For example, Network B 14 can have a second source 20, shown as Storage Device B, and a second destination device 22, shown as Computer B. It is likely that an actual implementation of Network B 14 would consist of multiple sources and multiple destination devices.

As is also shown on FIG. 1, the data processing system 10 will typically have an interconnection between the independent network A 12 and the independent network B 14. The interconnection between networks can be the internet 24, a direct connection, a wide area network, or local area network. The interconnection between network A 12 and network B 14 can be private or public. For illustration purposes, the interconnection between network A 12 and network B 14 is shown on FIG. 1 as the internet 24.

The data processing system 10 may also have multiple destination devices connected to the system through the internet 24, which destination devices are not associated with a particular network or source. For illustration purposes, on FIG. 1 a third destination device 26 is shown connected to the internet 24.

The invention operating within the data processing system 10 is a real time event notification network where notifications generated at a source are published to one or more subscribing destination devices and republished or pushed from the destination device receiving the notification to select other destination devices in the data processing system 10.

Preferably, the invention is implemented as an application installed on each source and each destination device. The application utilizes the publisher/subscriber model in order to inform a user about events. Notifications are transmitted to a subscribing agent, which is typically a destination device, from a publishing agent, which can be either a source or a destination device relaying notifications to another destination device. If the application is running on a source, and the source is a device such as a storage controller, the application will typically be running on the source's operating system as a service or daemon. Alternatively, if the application is running on a computer such as a PC, the application may be implemented as a separate utility program. Preferably, the application will be implemented using the Java® programming language or another platform independent programming language to facilitate the installation of the application across a wide range of types of sources and destination devices as described in detail above.

The application may feature security features such as required use of a password by a destination device during the subscription process. In addition, information may be transmitted across the public network, therefore, an encrypted connection between the publisher and subscriber may be preferable.

Figure 2:
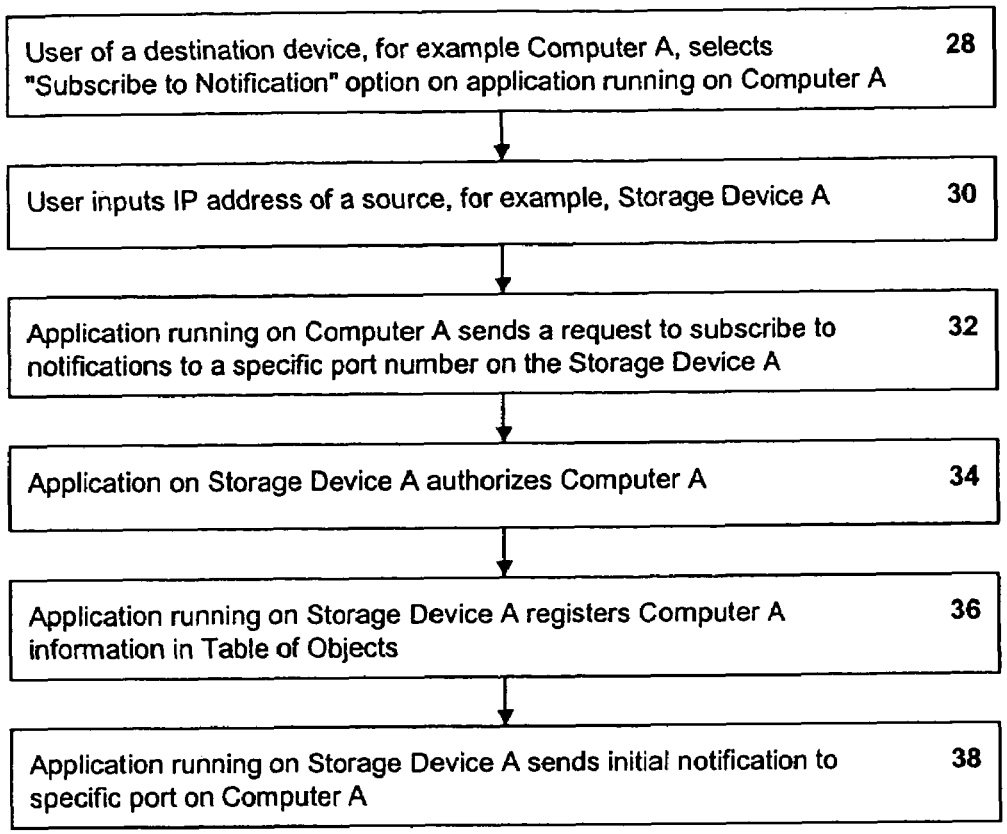
FIG. 2 is a data flow diagram that illustrates one manner in which a destination device may subscribe to receive notifications from a source.

FIG. 2 illustrates the steps which may be followed for an initial subscription to notifications between a destination device and a source. The subscription process begins when a user of a first destination device 18, which is shown on FIG. 1 and FIG. 2 as Computer A, selects a "Subscribe to Notification" option on the application running on Computer A (step 28). The user next inputs the IP address of a source from which the user desires to receive notifications (step 30). A representative source would be a first source 16, which is represented as Storage Device A on FIG. 1 and FIG. 2. Upon input of the IP address of Storage Device A, the application running on Computer A sends a request to "Subscribe to Notifications". This request is sent to a specific port number associated with the application on Storage Device A (step 32). Upon receipt of the request to subscribe, the application running on Storage Device A authorizes the subscription request of Computer A (step 34). The authorization process may be any known authorization process, typically authorization consists at least in part of the comparison of a password supplied by Computer A with a database of allowable passwords. Upon authorization of Computer A, the application running on Storage Device A registers Computer A's IP address and other identifying information in a table of objects maintained on Storage Device A in a notification database (step 36). The subscription process is complete when the application running on Storage Device A sends an initial notification to the application specific port on Computer A (step 38).

Upon completion of the subscription process, notifications concerning events associated with Storage Device A, are sent to the subscribed destination device, Computer A. Preferably, as part of the subscription process, the user of Computer A can specify the level of notification service required. For example, the user may request continuous notifications. In this instance, Storage Device A will publish notifications to Computer A at preselected periodic intervals, such as every minute, every 5 minutes, or at another select interval. Alternatively, the user of Computer A may have specified during the subscription process that notifications be sent only when the status of the source changes. In that instance, Storage Device A will publish a notification to Computer A only when a status change or event of preselected magnitude occurs. Preferably, the user of Computer A will be able, through the application, to contact Storage Device A at any time and receive a contemporaneous return status notification.

Referring back to FIG. 1, the user of a second destination device 22, shown on FIG. 1 as Computer B, may have subscribed to receive notifications published by a second source 20, shown on FIG. 1 as Storage Device B. The steps for the subscription of Computer B to receive notifications from Storage Device B can be the same as those described above for Computer A receiving notifications from Storage Device A and depicted graphically on FIG. 2. In each case, the user is receiving notifications generated from within his or her particular network.

Figure 3:
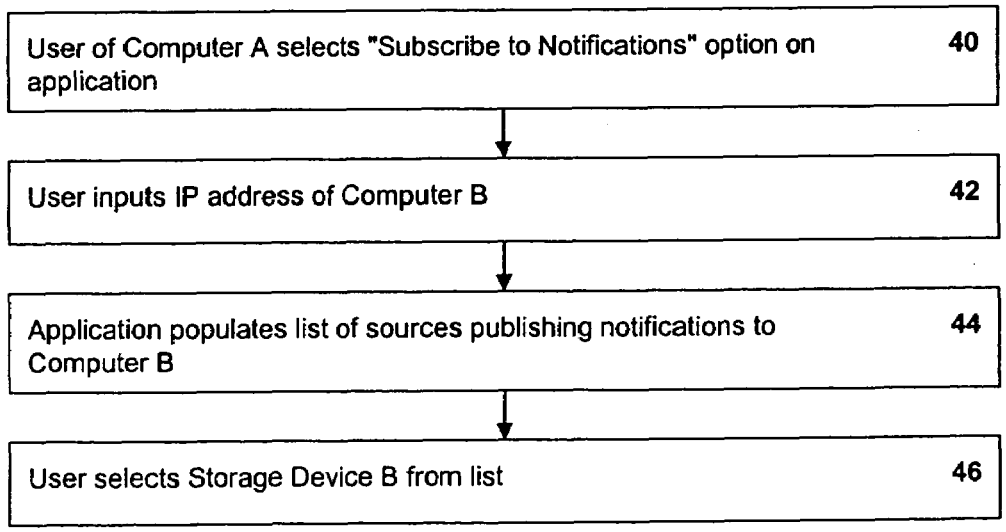
FIG. 3 is a data flow diagram that illustrates one manner in which a destination device may be used to subscribe to receive notifications published by a source to a second destination device.
Figure 4:
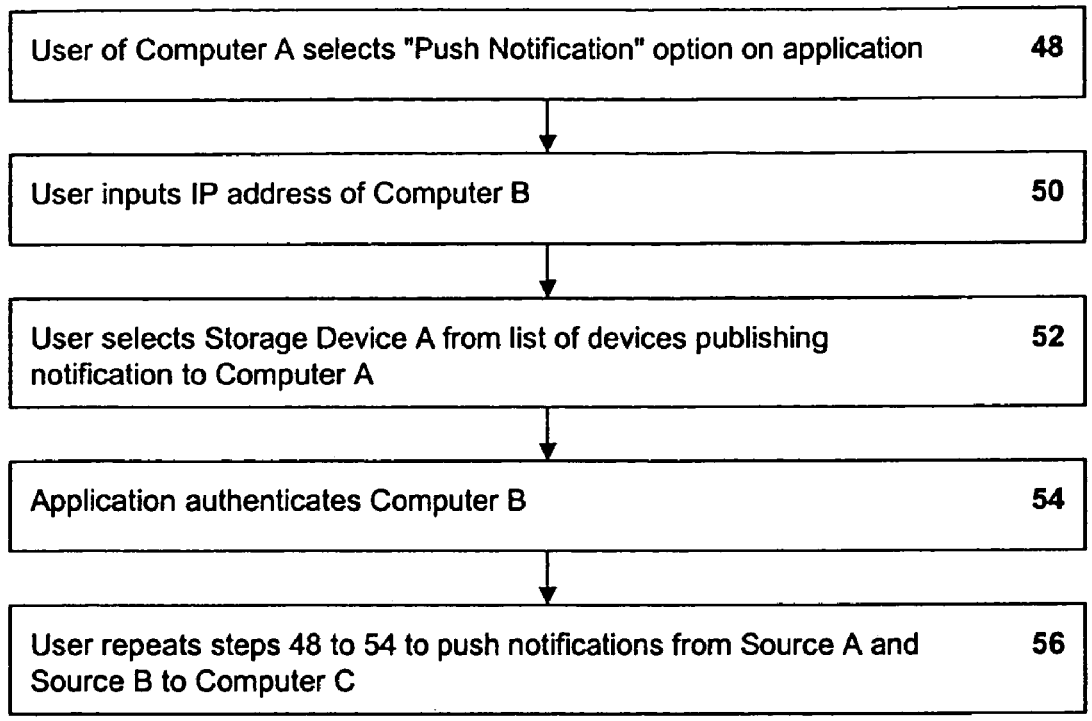
FIG. 4 is a data flow diagram that illustrates one manner in which a destination device may be used to republish notifications received from a source to a second destination device.
Figure 5:
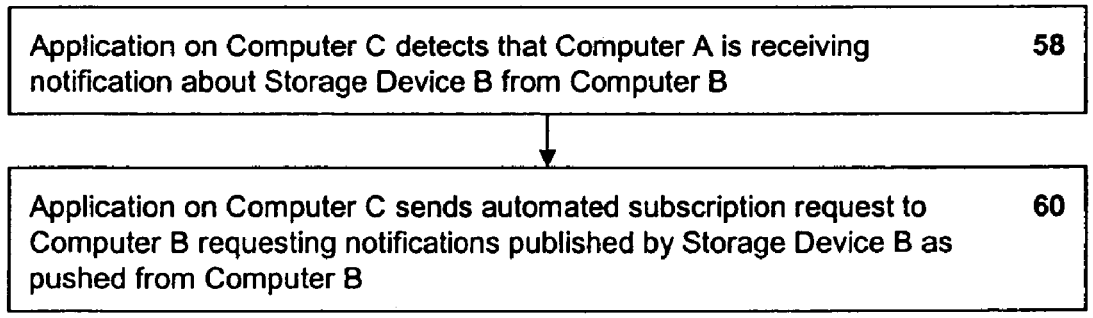
FIG. 5 is a data flow diagram that illustrates one manner in which a destination device may autonomously subscribe to another destination device closer to a source when a notification is being relayed through multiple destination devices.

The flexibility of Applicant's invention as a real time cross network event notification system is illustrated in FIGS. 3-5. FIG. 3 is a data flow diagram which shows how the user of Computer A can subscribe to receive notifications published by Storage Device B, through Computer B. The fundamental serial publication process begins when the user of Computer A selects the "Subscribe to Notifications" option on the application running on Computer A (step 40). In response to a prompt from the application, the user inputs the IP address of Computer B (step 42). The application responds by contacting the application running on Computer B and populating a list of sources publishing notifications to Computer B (step 44). In the example given above, Storage Device B is publishing notifications to Computer B. Upon examination of the list, the user selects Storage Device B from the list (step 46). Assuming authentication has been completed, Computer A then begins receiving notifications from Computer B and, thus, indirectly from Storage Device B.

It is important to note that the notifications from Computer B from Storage Device B are published first to Computer B, which is a destination device. Computer B then republishes the notification concerning Storage Device B to Computer A. Thus, a destination device may act as both a subscribing agent and a publishing agent according to Applicant's invention.

In addition to subscribing to receive notifications from sources publishing directly to another destination device such as the second destination device 22 (Computer B of FIG. 1), the user of a destination device such as the first destination device 18 (Computer A of FIG. 1) can also push notifications published directly to one destination device or to other destination devices. As shown in FIG. 4, the push or republishing process commences when the user of a first destination device 18, for example Computer A, selects the push notification option on the application running on Computer A (step 48). The user must know the IP address of the destination device to which notifications are to be pushed. In the example of FIG. 4, the user next inputs the IP address of Computer B (step 50). The user selects a source, for example Storage Device A, from a list of devices publishing notifications to Computer A (step 52). The application then authenticates Computer B as described above (step 54) and upon authentication, Computer A begins pushing or republishing notifications received from Storage Device A to Computer B. The push process can thus be implemented without user input at Computer B.

As is also shown on FIG. 1, many other destination devices can be connected to the data processing system 10. These destination devices may, but do not have to, be associated with an independent network. Other destination devices are represented on FIG. 1 by a third destination device 26 (Computer C). The user of Computer A may repeat steps 48-54 as shown on FIG. 4 to push notifications to a third destination device 26 or any other destination device connected to the entire data processing system. Alternatively, a user stationed at the third destination device 26 could subscribe to receive republished notifications from any other destination device according to steps 40-46 as set forth in FIG. 3.

Assuming the steps shown on FIGS. 2-4 have been completed and a user of Computer A has pushed notifications to Computer C, it can be noted that notifications from Storage Device B are published first to Computer B, then republished to Computer A, and in the above example, finally republished to Computer C. However, the republication step through Computer A is a step which could be eliminated. In a preferred embodiment of the invention, the application running on Computer C will detect that Computer A is receiving notification about Storage Device B from Computer B (step 58). In conjunction with the detection of the multiple publication steps, the application may send an automated subscription request to Computer B from Computer C requesting that notifications published by Storage Device B to Computer B be directly republished to Computer C, thus eliminating the intermediate publication and republication step at Computer A (step 60). Thus, the application, when installed in a complicated data processing system having numerous sources and numerous destination devices, will align the publication and republication chains in an efficient manner.

The illustrated logic of FIGS. 2-5 show certain events occurring in a certain order. In alternative embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The described techniques for distribution of notifications within a data processing system may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., magnetic storage medium such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. Of course, those skilled in the art will recognize that many modifications may be made to this configuration without departing from the scope of the implementations and that the article of manufacture may comprise any information bearing medium known in the art.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A method of publishing notifications within a data processing system comprising a first source generating a first event notification concerning an event with respect to the first source, a first destination device and a second destination device, the method comprising:

transmitting to the first source a subscription from the first destination device to receive the first event notification from the first source;

receiving at the first destination device a subscription from the second destination device to receive the first event notification from the first destination device;

receiving at the first destination the first event notification published from the first source;

republishing the first event notification from the first destination device to the second destination device;

wherein the data processing system further comprises a second source generating a second event notification concerning an event with respect to the second source, the method further comprising:

transmitting to the second destination device a subscription from the first destination device to receive the second event notification subscribed to by the second destination device; and receiving at the first destination the second event notification republished from the second destination device.

2. The method of claim 1 wherein the data processing system further comprises a third destination device, the method further comprising;
  receiving at the first destination device a subscription from the third destination device to receive the first event notification and the second event notification from the first destination device; and
  republishing the first event notification and the second event notification from the first destination device to the third destination device.

3. The method of claim 1 wherein the data processing system further comprises a third destination device, the method further comprising:
  autonomously subscribing at the first destination device the third destination device to receive the first event notification from the first destination device; and
  pushing the first event notification from the first destination device to the third destination device.

4. The method of claim 1 wherein the subscription of the first destination device causes the first source to publish the first event notification at select periodic intervals.

5. The method of claim 1 wherein the subscription of the first destination device causes the first source to publish the first event notification when a status of the first source changes.

6. The method of claim 1 wherein the first destination device causes the first source to publish the first event notification upon receipt of a status request from the first destination device.

7. The method of claim 1 further comprising, prior to transmitting the subscription to the second destination device:
  receiving at the first destination device a list of event notifications subscribed to by the second destination device from at least the second source; and
  selecting from the list the second event notification.

* * * * *